United States Patent
Tom et al.

[19]

[11] Patent Number: 6,027,547
[45] Date of Patent: Feb. 22, 2000

[54] FLUID STORAGE AND DISPENSING VESSEL WITH MODIFIED HIGH SURFACE AREA SOLID AS FLUID STORAGE MEDIUM

[75] Inventors: Glenn M. Tom, New Milford, Conn.; Duncan W. Brown, La Jolla, Calif.

[73] Assignee: Advanced Technology Materials, Inc., Danbury, Conn.

[21] Appl. No.: 09/080,536

[22] Filed: May 18, 1998

Related U.S. Application Data

[60] Provisional application No. 60/046,781, May 16, 1997.

[51] Int. Cl.[7] .................................................. B01D 53/04
[52] U.S. Cl. .................................. 95/96; 95/106; 95/128; 95/132; 95/133; 95/136; 95/142; 95/143; 96/108; 96/146; 96/147
[58] Field of Search ................................ 55/524; 95/90, 95/95, 104, 106, 133, 900–903, 127–132, 134–147; 96/108, 144, 153

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 2,356,334 | 8/1944 | Maude et al. | 206/0.7 X |
| 2,663,626 | 12/1953 | Spangler | 206/0.7 X |
| 2,987,139 | 6/1961 | Bush | 95/133 |
| 2,997,371 | 6/1961 | Wadsworth et al. | 95/131 X |
| 3,006,153 | 10/1961 | Cook | 206/0.7 X |
| 3,116,132 | 12/1963 | Haller et al. | 95/132 X |
| 3,144,200 | 8/1964 | Taylor et al. | 96/108 X |
| 3,287,432 | 11/1966 | Sensel | 95/95 |
| 3,675,392 | 7/1972 | Reighter | 95/96 |
| 3,713,273 | 1/1973 | Coffee | 96/128 X |
| 3,719,026 | 3/1973 | Sand | 95/106 |
| 3,788,036 | 1/1974 | Lee et al. | 96/130 X |
| 4,023,701 | 5/1977 | Dockery | 206/0.7 X |
| 4,263,018 | 4/1981 | McCombs et al. | 96/130 X |
| 4,343,770 | 8/1982 | Simons | 206/0.7 X |
| 4,414,005 | 11/1983 | DeBiévre et al. | 95/127 |
| 4,578,256 | 3/1986 | Nishino et al. | 95/133 X |
| 4,723,967 | 2/1988 | Tom | 95/90 |
| 4,738,693 | 4/1988 | Tom | 95/90 |
| 4,749,384 | 6/1988 | Nowobilski et al. | 96/108 X |
| 4,761,395 | 8/1988 | Tom et al. | 502/401 |
| 4,881,958 | 11/1989 | Eckardt et al. | 96/127 |
| 5,024,683 | 6/1991 | Tooley et al. | 95/900 X |
| 5,051,117 | 9/1991 | Prigge et al. | 55/58 |
| 5,089,244 | 2/1992 | Parent et al. | 95/133 X |
| 5,133,787 | 7/1992 | Diot et al. | 96/121 |

(List continued on next page.)

FOREIGN PATENT DOCUMENTS

| | | | |
|---|---|---|---|
| 1095796 | 12/1960 | Germany | 95/133 |
| 2264512 | 1/1974 | Germany | 95/133 |
| 3139-781 | 4/1983 | Germany | 96/122 |
| 52-72373 | 6/1977 | Japan | 96/130 |
| 63-88017 | 4/1988 | Japan | 96/121 |
| 3-127606 | 5/1991 | Japan | 96/108 |
| 1181692 A | 9/1985 | U.S.S.R. | 95/133 |
| 1544475A1 | 2/1990 | U.S.S.R. | 95/131 |
| 1583151A1 | 5/1990 | U.S.S.R. | 95/133 |

OTHER PUBLICATIONS

"Beaded Carbon UPS Solvent Recoery", *Chemical Engineering*, vol. 84, No. 18, pp. 39–40, Aug. 29, 1977.

*Primary Examiner*—Robert H. Spitzer
*Attorney, Agent, or Firm*—Steven J. Hultquist; Oliver A.M. Zitzmann

[57] ABSTRACT

A fluid storage and dispensing system, comprising: a fluid storage and dispensing vessel constructed and arranged for selective dispensing of fluid therefrom; a solid-phase support in the vessel; and an affinity medium on the solid-phase support, wherein the affinity medium reversibly takes up the fluid when contacted therewith, and from which the fluid is disengagable under dispensing conditions. The affinity medium may be a liquid, oil, gel, or solid (porous solid, thin film solid, or bulk solid). The system of the invention may be employed for the storage and dispensing of fluids such as hydride, halide and dopant gases for manufacturing of semiconductor products.

32 Claims, 2 Drawing Sheets

U.S. PATENT DOCUMENTS

| | | |
|---|---|---|
| 5,151,395 | 9/1992 | Tom .................................................. 502/67 |
| 5,202,096 | 4/1993 | Jain .................................................. 96/126 X |
| 5,238,469 | 8/1993 | Briesacher et al. ........................ 96/126 X |
| 5,238,899 | 8/1993 | Kadowaki et al. ......................... 95/90 X |
| 5,281,257 | 1/1994 | Harris ............................................. 95/900 X |
| 5,290,342 | 3/1994 | Wikman et al. .............................. 95/106 X |
| 5,330,560 | 7/1994 | Chao et al. .................................... 95/900 X |
| 5,385,689 | 1/1995 | Tom et al. ..................................... 252/194 |
| 5,409,526 | 4/1995 | Zheng et al. .................................. 96/132 |
| 5,417,742 | 5/1995 | Tamhankar et al. ........................ 95/96 |
| 5,518,528 | 5/1996 | Tom et al. ..................................... 95/103 |
| 5,704,965 | 1/1998 | Tom et al. ..................................... 95/106 X |
| 5,707,424 | 1/1998 | Tom et al. ..................................... 95/95 |
| 5,761,910 | 6/1998 | Tom ............................................... 95/95 X |
| 5,833,739 | 11/1998 | Klattle et al. ................................. 95/902 X |
| 5,837,027 | 11/1998 | Olander et al. .............................. 95/106 X |

FLUID STORAGE AND DISPENSING VESSEL WITH MODIFIED HIGH SURFACE AREA SOLID AS FLUID STORAGE MEDIUM

This application claims benefit of Provisional Application Ser. No. 60/046,781 filed May 16, 1997.

BACKGROUND OF THE INVENTION

1. Field of the Invention

This invention relates generally to storage and dispensing systems for the selective dispensing of fluid from a vessel in which the fluid is (i) retained by a retention medium including a solid sorbent to which an affinity medium has been applied, and (ii) released from the retention medium in the dispensing operation under pressure diffential and/or thermal dispensing conditions for discharge from the storage and dispensing vessel.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about 30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder. The gas storage and dispensing vessel of the Tom et al. patent thus reduces the pressure of stored sorbate gases by reversibly adsorbing them onto a carrier sorbent, e.g., a zeolite or activated carbon material.

SUMMARY OF THE INVENTION

The present invention relates to a system for storage and dispensing of a fluid.

In one aspect, the invention relates to a fluid storage and dispensing system, comprising:

a fluid storage and dispensing vessel constructed and arranged for selective dispensing of fluid therefrom;

a solid-phase support in the vessel; and an affinity medium on the solid-phase support, wherein the affinity medium reversibly takes up the fluid when contacted therewith, and from which the fluid is disengagable under dispensing conditions.

A dispensing assembly may be coupled in fluid flow communication with the storage and dispensing vessel, and constructed and arranged for selective on-demand dispensing of fluid, after thermal, concentration and/or pressure differential-mediated release of the fluid from the affinity medium. The dispensing assembly may suitably be constructed and arranged:

(I) to provide, exteriorly of the storage and dispensing vessel, a pressure below the pressure in the vessel, to effect release of fluid from the affinity medium, and flow of released fluid from the vessel through the dispensing assembly; and/or (II) to flow thermally released fluid therethrough, and comprising means for heating the affinity medium to effect release of the fluid therefrom, so that the released fluid flows from the vessel into the dispensing assembly.

A further aspect of the invention relates to a method of storing and dispensing a fluid, comprising:

providing a vessel constructed and arranged for selective dispensing of fluid therefrom, containing a solid-phase support with an affinity medium thereon, wherein the affinity medium reversibly takes up the fluid when contacted therewith, and from which the fluid is disengagable under dispensing conditions;

contacting said fluid with the affinity medium on the solid-phase support for take-up of the fluid by the affinity medium;

disengaging the fluid from the affinity medium under dispensing conditions; and dispensing the fluid from the vessel.

Other aspects and features of the invention will be more fully apparent from the ensuing disclosure.

DETAILED DESCRIPTION OF THE INVENTION AND PREFERRED EMBODIMENTS THEREOF

Figure 1:
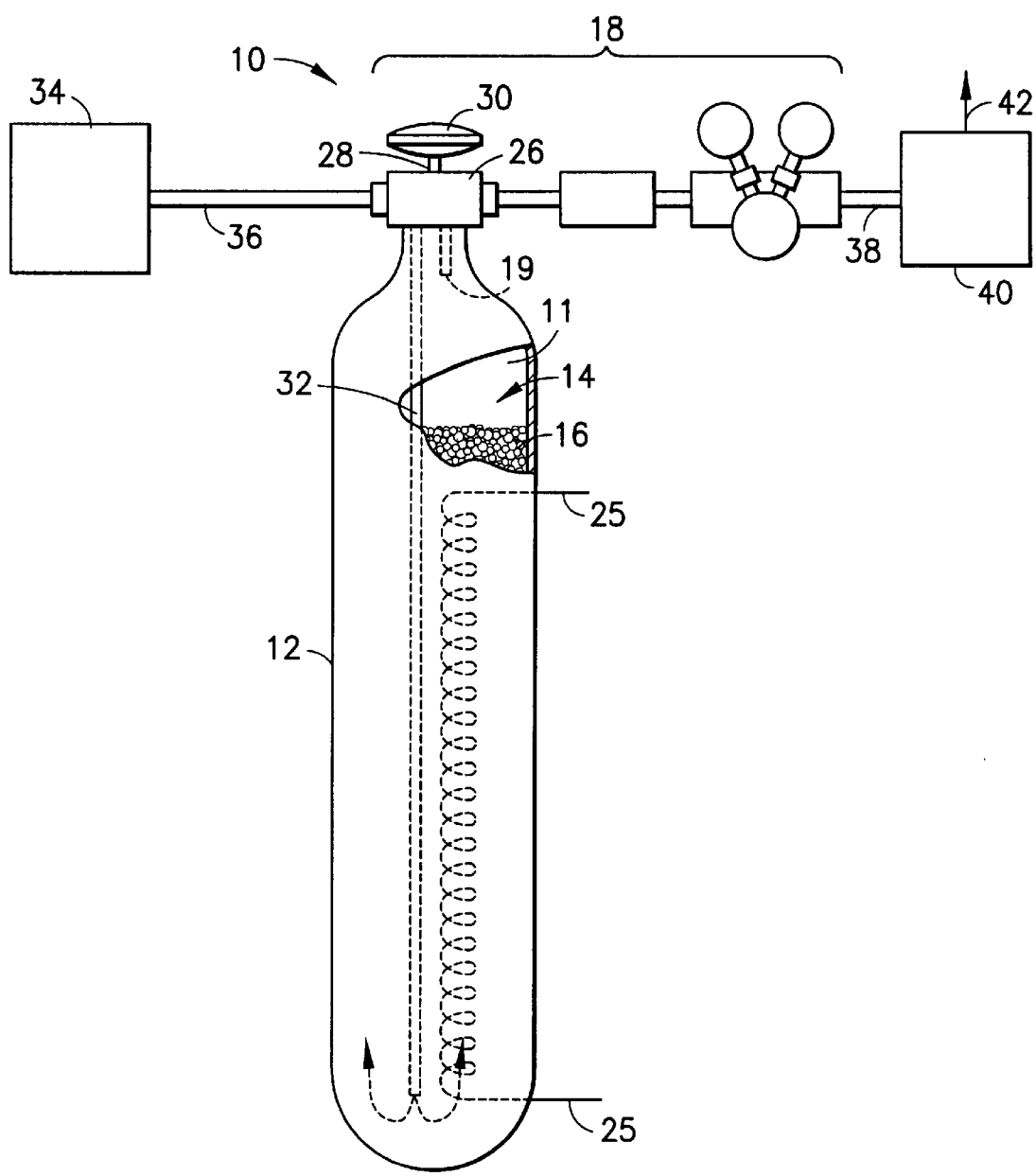
FIG. 1 is a schematic perspective representation of a storage and dispensing vessel and associated flow circuitry according to one embodiment of the invention, which may be usefully employed for the storage and dispensing of fluid.
Figure 2:
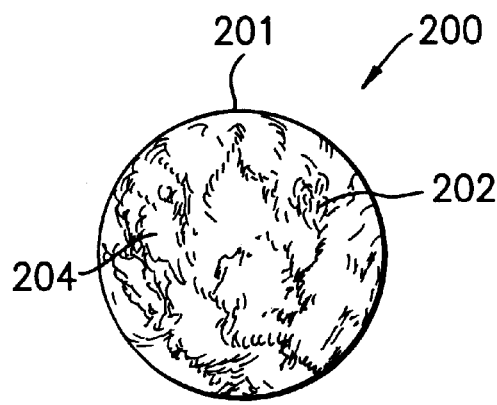
FIG. 2 is a perspective view of a support medium particle bearing a coating thereon of an affinity medium, and suitable for use in a storage and dispensing system in accordance with the present invention.
Figure 3:
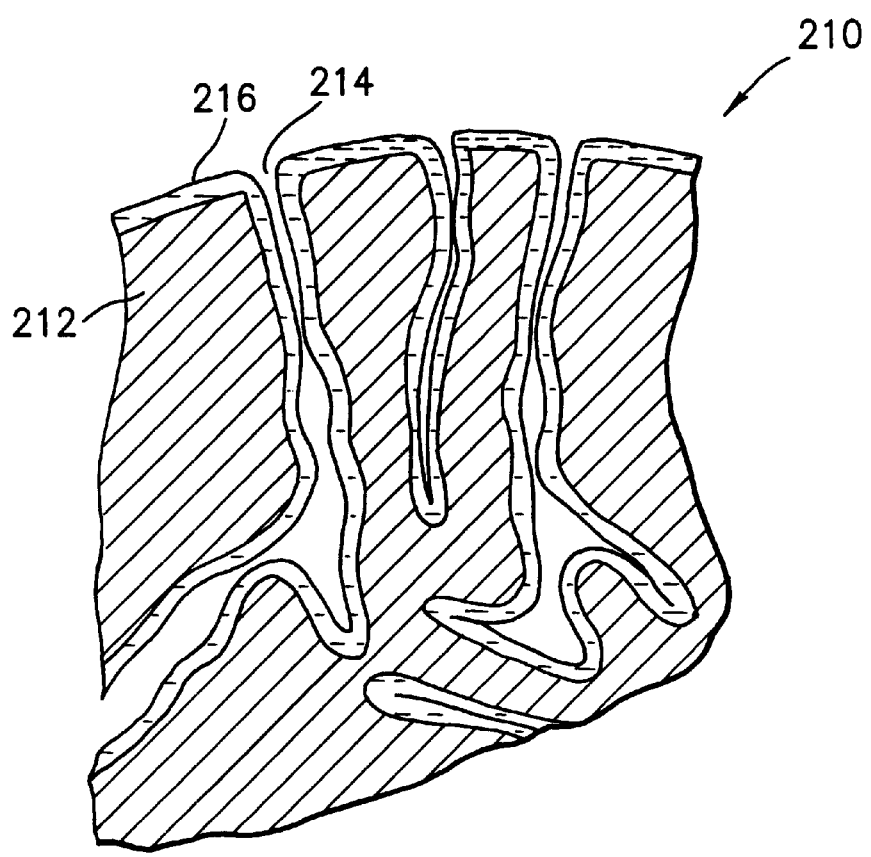
FIG. 3 is a sectional view of a portion of a porous support medium particle having a liquid affinity medium in its pores.

The disclosures of the following U.S. patents and U.S. patent applications are hereby incorporated herein by reference in their entirety:

U.S. Pat. No. 5,935,305 issued Aug. 10, 1999;
U.S. Pat. No. 5,518,528 issued May 21, 1996;
U.S. Pat. No. 5,704,965 issued Jan. 6, 1998;
U.S. Pat. No. 5,704,967 issued Jan. 6, 1998;
U.S. Pat. No. 5,707,424 issued Jan. 13, 1998;
U.S. Pat. No. 5,761,910 issued May 20, 1997; and
U.S. patent application Ser. No. 09/002,278 filed Dec. 31, 1997.

The present invention contemplates a fluid storage and dispensing system including a vessel constructed and arranged for selective dispensing of fluid therefrom. The vessel defines an enclosed interior volume therewithin, holding a bed of solid support material, e.g., in a particulate form. An affinity medium is provided on the solid support material. Such affinity medium reversibly takes up the fluid to be stored and subsequently dispensed from the vessel. Under dispensing conditions, the affinity medium releases the fluid and the fluid is dispensed from the vessel.

The dispensing conditions may include one or more of a concentration differential, a pressure differential, and a thermal heating condition, to disengage the fluid from the affinity material holding same. The dispensing condition preferably includes a dispensing pressure exterior of the vessel that is lower than the pressure within the vessel.

The fluid once disengaged under dispensing conditions is flowed out of the vessel, by suitable means such as a discharge port or opening, a flow control valve joined in flow communication with the interior volume of the vessel, a fluid discharge manifold to which the vessel is leak-tightly joined, a pipe, conduit, hose, channel or other suitable device and/or assembly, by which the fluid can be flowed out of the vessel when desired, under dispensing conditions.

In the fluid storage and dispensing system of the invention, the solid support medium may comprise any suitable material, such as a physical sorbent medium, or alternatively an inert medium.

Illustrative solid support media comprising a physical sorbent medium include carbon, silica, alumina, aluminosilicates, macroreticulate resins, kieselguhr, and combinations of two or more of the foregoing. Illustrative inert media for the solid support medium include vitreous materials, ceramic materials, inert polymers such as porous Teflon®, porous silicon, and combinations thereof.

The affinity medium may include liquids, solids and combinations thereof. For example, the affinity medium may comprise a liquid in which the fluid is soluble, or the affinity medium may alternatively comprise an oil, wax, gel, porous solid, thin film material or bulk solid, to which the fluid to be stored and dispensed has an affinity, i.e., that permits "loading" of the affinity medium with the fluid.

The affinity medium may for example include a liquid, oil, wax, gel, porous solid, thin film solid material or bulk solid in which the fluid is soluble, or with respect to which the fluid is reversibly adsorbable. As a further variation, the affinity medium may include a species with respect to which the fluid is reversibly reactive, and from which the fluid species may be derived under the dispensing conditions, e.g., by the application of heat and/or reduced pressure conditions, by flow of a carrier gas or a reactant gas through the vessel, or in any other suitable manner.

The system of the invention may be employed for the storage and dispensing of fluids such as hydride, halide and dopant gases for manufacturing of semiconductor products.

In a specific embodiment, the fluid may comprise a gas, and the affinity medium may include a material such as a wax, oil, liquid or porous solid in which such gas is soluble, or on which the gas is physically adsorbable. The particulate solid support may be a material that has a high (e.g., >100 meters$^2$/gram) surface area, and that is compatible with the affinity medium. The particulate solid support may be a physical sorbent material, or alternatively an inert medium.

The size of the solid support material may be of any suitable character, as may the shape of such material. Shapes that may be employed for the solid support include spherical shapes, beads, cylindrical shapes, flakes, granules, blocks, pellets, extrudates, powders, cloth, web materials, honeycomb or other monolithic forms, composites, and other suitable conformations of useful solid-phase materials, having retentive capacity and compatibility for the affinity medium, as well as for the fluid sought to be stored and subsequently dispensed. The particular size and shape useful for a given end-use application may be readily determined within the skill of the art, without undue experimentation.

Specific examples of the solid support medium include: crystalline aluminosilicate compositions, e.g., a micropore aluminosilicate composition with a pore size in the range of from about 4 to about 13 Å, or a mesopore crystalline aluminosilicate composition with a pore size in the range of from about 20 to about 40 Å; and a bead activated carbon sorbent of highly uniform spherical particle shape, e.g., a BAC-MP, BAC-LP, or a BAC-G-70R bead carbon material (Kureha Corporation of America, New York, N.Y.).

The invention thus contemplates a fluid storage and dispensing system, in which a vessel is constructed and arranged for selective dispensing of fluid therefrom, containing a bed of particulate solid support material in the vessel, with an affinity medium on the solid support material. The affinity medium reversibly takes up the fluid when contacted therewith, and the stored fluid is disengaged from the support medium under dispensing conditions, and the disengaged fluid is dispensed from the vessel.

A dispensing assembly may be coupled in fluid flow communication with the storage and dispensing vessel, and constructed and arranged for selective on-demand dispensing of fluid, after thermal, concentration and/or pressure differential-mediated release of the fluid from the affinity medium. The dispensing assembly may suitably be constructed and arranged:

(I) to provide, exteriorly of the storage and dispensing vessel, a pressure below the pressure in the vessel, to effect release of fluid from the affinity medium, and flow of released fluid from the vessel through the dispensing assembly; and/or (II) to flow thermally released fluid therethrough, and comprising means for heating the affinity medium to effect release of the fluid therefrom, so that the released fluid flows from the vessel into the dispensing assembly.

The aforementioned heating means may comprise a heating jacket for the vessel, heating coils or heat transfer passages therein, infrared or other radiation heating means (utilizing a transparent vessel or a windowed vessel), or other thermal energy input means.

In the ensuing disclosure, the invention will be described with reference to a gas as the stored and subsequently dispensed fluid, however, it will be recognized that the invention is broadly applicable to liquids, gases, vapors, and multiphase fluids, and contemplates storage and dispensing of fluid mixtures as well as single component fluids.

Referring now to the drawings, FIG. 1 is a schematic representation of a storage and dispensing system 10 comprising a storage and dispensing vessel 12. The storage and dispensing vessel may for example comprise a conventional gas cylinder container of elongate character. In the interior volume 11 of such vessel is disposed a bed 14 of a suitable solid-phase support 16 coated with an affinity medium containing a gas.

The vessel 12 is provided at its upper end with a conventional cylinder head assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein. The cylinder head assembly includes a main valve body 26 containing a valve element (not shown) which is mechanically coupled by valve stem 28 with a hand wheel 30. The hand wheel is manually actuatable to open the valve to flow of the gas through port 19.

The main valve body 26 is also optionally connected to a carrier gas feed conduit 36, which is joined in turn to carrier gas source 34. The carrier gas may be an inert gas such as argon, helium, nitrogen or the like, and the carrier gas source 34 may be a cylinder or other source vessel for such gas. The carrier gas may be flowed through the feed conduit 36 to dip tube 32 for egress at the lower end of the dip tube into the interior volume 11 of the vessel 12.

To control the flow and rate of the carrier gas, the main valve body may be provided with a separate flow control or actuator, and/or a flow control means (a flow control valve, mass flow controller, etc.) may be provided in the feed conduit 36, to yield an appropriate flow of the carrier gas stream through the vessel, for subsequent discharge into the dispensing assembly 18. By such flow of carrier gas through the vessel, a concentration differential is created that mediates the release of the gas from the affinity medium on the solid-phase support particles in the bed 14.

Alternatively, or additionally, the gas dispensing operation may be carried out with release of the gas from the affinity medium on the solid-phase support particles in the bed 14, by pressure differential-mediated release of the gas. Such pressure differential may be established by flow communication between the storage and dispensing vessel, on the one hand, and the exterior dispensing environment or locus of use, on the other.

For example, the dispensing assembly 18 may be coupled in fluid flow communication with a downstream discharge conduit 38 discharging the gas to a lower pressure end use facility 40, such as an ion implantation operation in a semiconductor manufacturing plant.

In the end use facility, the gas is utilized in a process carried out therein, and a vent or waste gas is produced, which is discharged in the vent conduit 42 from the facility. The end use facility may in the case of semiconductor manufacturing utilize other gas-consuming operations, such as epitaxial growth, etching, chemical mechanical planarization, cleaning, lithography, etc.

The vessel 12 may be provided with internal heating means schematically represented by heating coil 25 (suitably energized by power supply means, not shown in FIG. 1) which serves to thermally assist disengagement of the fluid from the affinity medium.

Preferably, however, the fluid is at least partially, and most preferably fully, dispensed from the storage and dispensing vessel containing the fluid by pressure differential-mediated release and/or concentration differential-mediated release of the fluid from the affinity medium.

The solid-phase support medium 16 may comprise a suitable high surface area material having retentive capacity for the affinity medium, so that the affinity medium satisfactorily holds the fluid to be stored and subsequently dispensed from the vessel 12. The affinity medium may for example comprise a bead activated carbon sorbent of highly uniform spherical particle shape, such as the BAC-MP, BAC-LP, and BAC-G-70R bead carbon materials commercially available from Kureha Corporation of America (New York, N.Y.).

The solid-phase affinity medium may be suitably processed or treated to ensure that it is devoid of trace components which may deleteriously affect the performance of the fluid storage and dispensing system. For example, the solid-phase affinity medium may be subjected to washing treatment, e.g., with hydrofluoric acid, to render it sufficiently free of trace components such as metals and oxidic transition metal species.

In preferred practice, the solid-phase affinity medium is a high surface area medium. As used herein, the term high surface area medium means a material having at least 10 square meters of surface area per gram of material, with the surface area being determined by BET surface area determination using liquid nitrogen as the working fluid, a methodology well known to those skilled in the art of determining material surface area characteristics. Preferably, the surface area determined by such BET method is at least 50 square meters per gram, and most preferably the surface area is at least 100 square meters per gram as determined by the BET method.

The affinity medium in the practice of the present invention may comprise any suitable material to which the fluid to be stored and dispensed has suitable affinity. Such affinity material may for example comprise a liquid in which the fluid to be stored and dispensed is soluble. Alternatively, the affinity material may comprise a wax, oil, paste or other solid, semi-solid, or viscoelastic medium on which the fluid to be stored and dispensed from the vessel is reversibly sorbed, e.g., by physical adsorption. For example, the affinity material may comprise a porous sol gel material such as a silica sol gel formed from a tetraethylorthosilicate solution by acid hydrolysis.

As mentioned, although it generally is preferred to operate solely by pressure differential, in respect of the release of the fluid to be dispensed from the storage and dispensing vessel, the system of the invention may in some instances advantageously employ a heater operatively arranged in relation to the storage and dispensing vessel for selective heating of the solid-phase support medium and the affinity medium, to effect thermally-enhanced release of the fluid from the affinity medium on the solid-phase support medium.

The affinity material that is present on the solid-phase support in the fluid-containing vessel of the invention may be a liquid in which the fluid of interest is soluble. The support may be a porous high-surface area material holding the affinity material by capillary action in its pores.

In general, the affinity material should have a suitably low vapor pressure so as not to introduce extraneous impurity or contaminant species into the sorbate gas dispensed from the storage and dispensing vessel.

Suitable affinity materials typically have a vapor pressure of less than about $13 \times 10^{-6}$ torr at standard (25° C., 1 atmosphere) conditions, preferably less than about $1.3 \times 10^{-6}$ torr at such conditions, and most preferably less than about $0.13 \times 10^{-6}$ torr at such conditions.

Additionally, the affinity material preferably is highly stable in character with respect to the fluid being stored thereon and dispensed therefrom, including good oxidative-reductive stability and good acid-based stability relative to such gas. Further, the affinity material should have appropriate polarity in relation to the gas species being stored thereon and dispensed therefrom.

By way of illustrative example, gases such as arsine, phosphine, hydrogen sulfide, diborane and stibine are desirably used as the fluid species with affinity materials that are polar and reductively stable; gases such as hydrogen chloride, boron trifluoride and boron trichloride are usefully employed with affinity materials that are polar and acid stable; and silane is desirably used with an affinity material that is non-polar and reductively stable. Chlorine is desirably used with affinity materials that are oxidatively stable, and ammonia is desirably used with affinity materials that are polar and base stable. Polar, acid-stable affinity materials include polysulfonated polystyrene and sulfonated polystyrene divinylbenzene. Polar and base-stable affinity materials include polyvinylamines and Carbowaxes. Useful non-polar affinity materials include polystyrene and silicone oils. Oxidatively stable affinity materials include perfluorinated polyethers such as materials commercially available under the trademark Krytox (DuPont, Wilmington, Del.).

Additional illustrative affinity materials include polyvinylalcohol (PVA), dextrans, polystyrene divinylbenzene, other hydroxy-functional organic coatings, and carbonaceous waxes having hydroxyl functionality. As another example, the affinity medium may comprise precursor functionalities which in contact with the gas being detected are converted to hydroxy functionality which then in turn reacts with the gas being stored to yield a reversibly bound gas species.

For example, in the storage and dispensing of trichlorosilane, it may be feasible to provide a surface coating on the solid-phase support of an alkoxide having alkoxy functionality, which in initial contact with trichlorosilane reacts to yield hydroxy functionality on the surface, which then reacts further to yield the reversibly bound species.

Various Carbowax polyethylene glycols and methoxypolyethylene glycols may be employed. Such materials are readily commercially available with molecular weights in the range of from about 200 to about 20,000.

The affinity material may be a porous solid such as a sol gel or other inorganic oxide, or alternatively a polymer. These materials preferably have the following characteristics:

good mass transfer characteristics (e.g., having a high porosity or void fraction, to allow rapid movement of fluid (gas) through the matrix; in the case of a polymer, being employed at a temperature above its glass transition temperature, since diffusion through a glassy polymer is slow and diffusion in a rubbery polymer is much faster; and having good solubility or adsorbance characteristics for the fluid of interest);

good mechanical stability (preferably being stationary—if polymeric, having a viscosity of at least 2 centistokes at 210° F.); and good chemical stability (material not decomposable by the fluid being stored; in the case of polymers, exhibiting a vapor loss of material that is less than 10 picogram per minute at the temperatures of use).

In the case of halogenated gas as the fluid species to be stored and dispensed, hydroxyl functionality which may permit reversible trihalosilane interaction with the substrate to form trihalosiloxy pendant functional groups on the support surface. Preferably, however, a porous sol gel coating of silica or other affinity coating will be used, providing sorptive affinity for the halosilane gas.

Examples of further illustrative gases, which may be stored and dispensed in the broad practice of the present invention, include trichlorosilane, trimethylindium, dimethylaluminumhydroxide, tetrachlorotitanium, tetrakisdiethylamidotitanium, tetrakisdimethylamidotitanium, tetraethylorthosilicate, tungsten hexafluoride, copper hexafluoroacetylacetonate vinyl trimethylsilane, pentakisdiethylamidotantalum, dimethylamidotantalum, fluorinated derivatives of tetraethylorthosilicate, trimethylgallium, triethylindium, dichlorosilane, octamethylcyclotetrasiloxane, titaniumisopropoxide, iron pentacarbonyl, isopropanol and trimethylaluninum.

The gas species being stored and dispensed may reversibly react with or adsorb on the coating material comprising the affinity medium, or alternatively, the gas may dissolve in the coating material constituting the affinity medium, with the extent of dissolution depending on Henry's law solubility behavior. An example is isopropanol (IPA) as the gas or vapor component, and Carbowax 400 as the affinity material, e.g., coated on a molecular sieve or activated carbon material as the support, to dissolve the IPA.

As another example, a silica may be used to adsorb trichlorosilane and remain stable in the acidic environment.

The silica can be deposited on the surface of the support from a sol gel. Sol gel can be formed from hydrolysis of tetraethylorthosilicate in a water/methanol solvent mix, with the soluble sol gel being spin-coated onto the support surface. The support may be spin coated with a loading of about 90 micrograms ($\mu$g) of the sol gel-derived silica, to provide a porous, high surface coating on the support surface.

The sol gel formulation utilized to form the metal species-containing inert porous material coating on the piezoelectric crystal may be made using general sol gel techniques well known and established in the art, e.g., the sol gel techniques disclosed in Bright, F. V., Dunbar, R. A. and Jordan, J. D. Anal Chem. 1996, 68, 604, "Development of Chemical Sensing Platforms Based on Sol-Gel-Derived Thin Films: Origin of Film Age vs Performance Trade-Offs."

The thinner the coating of the affinity medium, the faster the take-up and release that is achieved by the affinity coating medium. In general, the affinity coating thickness should be at least 0.1 micrometer and preferably at least 1 micrometer, however any suitable thickness may be utilized consistent with the specific affinity coating and gas species being stored, as is readily determinable within the skill of the art without undue experimentation.

The system of the invention optionally may be constructed with the affinity medium-coated support being provided in the storage and dispensing vessel in combination with a chemisorbent material having a sorptive affinity for contaminants, e.g., decomposition products, of the fluid stored therein. Such chemisorbent material may for example comprise a material such as barium metal, protected from contact with the fluid being stored, in a restricted area or compartment of the vessel permeable to the contamination species to be chemisorbed.

FIG. 2 is a perspective view of a support medium particle 200 bearing a coating thereon of an affinity medium, and suitable for use in a storage and dispensing system in accordance with the present invention.

The support medium particle 200 constitutes a substrate 201 having a porous surface 202 with an affinity coating 204 thereon in which the gas to be stored and subsequently dispensed is soluble. The solubilizing liquid may be any suitable composition in which the gas to be stored and subsequently dispensed is sufficiently soluble at storage conditions, and from which the gas is satisfactorily desolubilizable at dispensing conditions.

Additionally, the substrate may have a sorptive affinity for the gas to be stored and subsequently dispensed, whereby the dual modality of solubilized retention in the affinity medium and physical adsorption retention on the support itself permits a high level of gas to be retained on the coated particle.

The coating in the FIG. 2 embodiment may be a liquid having suitable surface tension and capillarity characteristics, relative to the dimensions of the pores in the substrate, so that the liquid is effectively wicked into and retained by capillarity and surface tension effects in the pores of the substrate.

Alternatively, the coating material may for example comprise Carbowax or a silicone oil material, or a polymeric material, e.g., one whose monomer(s) are placed on the surfaces of the substrate and polymerized in situ. The coating may also be formed from a solvent solution of a suitable solid material; after application of the solution to the substrate, the solvent phase is evaporated to leave a residual coating of the solid affinity material on the substrate.

FIG. 3 is a sectional view of a portion of a porous support particle 210 having a liquid affinity medium in its pores and on its surface.

FIG. 3 is a sectional view of a portion of the liquid-saturated porous support particle 210, comprising the porous substrate 212 having pores 214 therein, and showing the liquid 216 blanketing the surfaces including walls of the pores as well as the outer surface of the substrate. In this instance, the surface tension and viscosity characteristics of the liquid are matched to the pore size, pore volume and pore tortuosity of the porous support particle so that the liquid affinity medium is retained in the pores and on the surface of the particle by surface tension and capillarity forces.

It will be appreciated that the support particle may comprise a specifically designed surface for such purpose, with surface topology and involutions that are matched to the particular liquid affinity medium so that it is held by the substrate particle.

A specific substrate material and a liquid for solubilizing the as to be stored and dispensed in the practice of the invention may therefore be readily determined without undue experimentation by the simple expedient of (1) assessing the solubility of the gas in the solubilizing liquid under the storage conditions to be encountered, (2) determining the rate and extent of desolubilization of the gas from the liquid under the process conditions to be employed in the dispensing operation, and (3) evaluating the retentive ability of the support for the liquid to be used as the affinity medium.

In such determinations, the wetting behaviors can be readily determined for the liquid on the specific solid-phase support by contact angle and surface energy data, the porosity of the solid-phase support can be determined by standard porosimetry techniques, and the surface area can be measured by standard BET surface area measurement tests.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure, with regard to the ensuing claims.

What is claimed is:

1. A method of storing and dispensing a fluid, comprising:

providing a vessel constructed and arranged for selective dispensing of fluid therefrom, containing a solid-phase support with an affinity medium thereon, wherein the affinity medium reversibly takes up the fluid when contacted therewith, and from which the fluid is disengagable under dispensing conditions;

contacting said fluid with the affinity medium on the solid-phase support for take-up of the fluid by the affinity medium;

disengaging the fluid from the affinity medium under dispensing conditions; and dispensing the fluid from the vessel;

wherein said fluid comprises a fluid species selected from the group consisting of ammonia chlorine, HCl, $H_2S$, arsine, phosphine, ammonia, diborane, stibine, trichlorosilane, trimethylindium, dimethylaluminumhydroxide, tetrachlorotitanium, tetrakisdiethylamidotitanium, tetrakisdimethylamidotitanium, tetraethylorthosilicate, tungsten hexafluoride, copper hexafluoroacetylacetonate vinyl trimethylsilane, pentakisdiethylamidotantalum, dimethylamidotantalum, fluorinated derivatives of tetraethylorthosilicate, trimethylgallium, triethylindium, octamethylcyclotetrasiloxane, titaniumisopropoxide, iron pentacarbonyl isopropanol, trimethylaluminum, chlorine, $BCl_3B_2D_6$, $(CH_3)_3Sb$, hydrogen fluoride, hydrogen chloride, $GeF_4$, $SiF_4$, deuterated hydrides, hydrogen iodide, hydrogen bromide, germane, hydrogen sulfide, hydrogen selenide, hydrogen telluride, $NF_3$, 1,1,1-trichloroethane, trans-1,2-dichloroethane, silanes, chlorosilanes, disilane, titanium tetrachloride, tetrakisdimethylamidotitanium, tetrakisdiethylamidotitanium, borane, trimethylborate, trimethylborite, triethylborate, triethylborite phosphorous trichloride, trimethylphosphate, trimethylphosphite, triethylphosphate, triethlyphosphite, and tritiated hydrides.

2. A method according to claim 1, wherein the solid-phase support comprises a bed of solid-phase support particles.

3. A method according to claim 1, wherein the solid-phase support comprises an inert medium.

4. A method according to claim 1, wherein the solid-phase support comprises a bed of physical sorbent particles.

5. A method according to claim 1, wherein the dispensing conditions comprise a condition selected from the group consisting of thermal dispensing, pressure differential dispensing, concentration differential dispensing, and combinations of two or more of the foregoing.

6. A method according to claim 1, wherein the dispensing conditions include a dispensing pressure exterior of the vessel that is lower than the pressure within the vessel.

7. A method according to claim 1, wherein the affinity medium is selected from the group consisting of liquids, solids and combinations thereof.

8. A method according to claim 1, wherein the affinity medium comprises a liquid in which said fluid is soluble.

9. A method according to claim 1, wherein said fluid comprises a gas.

10. A fluid storage and dispensing system, comprising:
a fluid storage and dispensing vessel constructed and arranged for selective dispensing of fluid therefrom;
a solid-phase support in the vessel; and
an affinity medium on the solid-phase support, wherein the affinity medium reversibly takes up the fluid when contacted therewith, and from which the fluid is disengageable under dispensing conditions;
said fluid comprising a fluid species selected from the group consisting of ammonia chlorine, HCl, $H_2S$, arsine, phosphine, ammonia, diborane, stibine, trichlorosilane, trimethylindium, dimethylaluminumhydroxide, tetrachlorotitanium, tetrakisdiethylamidotitanium, tetrakisdimethylamidotitanium, tetraethylorthosilicate, tungsten hexafluoride, copper hexafluoroacetylacetonate vinyl trimethylsilane, pentakisdiethylamidotantalum, dimethylamidotantalum, fluorinated derivatives of tetraethylorthosilicate, trimethylgallium, triethylindium, octamethylcyclotetrasiloxane, titaniumisopropoxide, iron pentacarbonyl, isopropanol and trimethylaluminum, chlorine, $BCl_3$, $B_2D_6$, $(CH_3)_3Sb$, hydrogen fluoride, hydrogen chloride, $GeF_4$, $SiF_4$, deuterated hydrides, hydrogen iodide, hydrogen bromide, germane, hydrogen sulfide, hydrogen selenide, hydrogen telluride, $NF_3$, 1,1,1-trichloroethane, trans-1,2-dichloroethane, silanes, chlorosilanes, disilane, titanium tetrachloride, tetrakisdimethylamidotitanium, tetrakisdiethylamidotitanium, borane, trimethylborate, trimethylborite, triethylborate, triethylborite phosphorous trichloride, trimethylphosphate, trimethylphosphite, triethylphosphate, triethlyphosphite, and tritiated hydrides.

11. A fluid storage and dispensing system according to claim 10, wherein the solid-phase support comprises a bed of solid-phase support particles.

12. A fluid storage and dispensing system according to claim 10, wherein the solid-phase support comprises an inert medium.

13. A fluid storage and dispensing system according to claim 10, wherein the solid-phase support comprises a bed of physical sorbent particles.

14. A fluid storage and dispensing system according to claim 10, wherein the solid-phase support comprises a material selected from the group consisting of carbon, silica, alumina, aluminosilicates, kieselguhr, and combinations of two or more of the foregoing.

15. A fluid storage and dispensing system according to claim 10, wherein the solid-phase support comprises an inert medium selected from the group consisting of vitreous materials, ceramic materials, inert polymers, porous silicon, and combinations of two or more of the foregoing.

16. A fluid storage and dispensing system according to claim 10, wherein the dispensing conditions comprise a condition selected from the group consisting of thermal dispensing, pressure differential dispensing, concentration differential dispensing, and combinations of two or more of the foregoing.

17. A fluid storage and dispensing system according to claim 10, wherein the dispensing conditions include a dispensing pressure exterior of the vessel that is lower than the pressure within the vessel.

18. A fluid storage and dispensing system according to claim 10, wherein the affinity medium is selected from the group consisting of liquids, solids and combinations thereof.

19. A fluid storage and dispensing system according to claim 18, wherein said fluid comprises a gas.

20. A fluid storage and dispensing system according to claim 10, wherein the affinity medium comprises a liquid in which said fluid is soluble.

21. A fluid storage and dispensing system according to claim 10, wherein said fluid comprises a gas, and said affinity medium comprises a liquid having a vapor pressure of less than $13 \times 10^{-6}$ torr.

22. A fluid storage and dispensing system according to claim 10, wherein the affinity medium comprises a material selected from the group consisting of: polyvinylalcohol (PVA), dextrans, polystyrene, polyvinylamines, polysulfonated polystyrenes, sulfonated polystyrene divinylbenzene, polystyrene divinylbenzene, silicone oils, hydroxy-functional organic coatings, and carbonaceous waxes including hydroxyl functionality.

23. A fluid storage and dispensing system according to claim 10, wherein the affinity medium comprises a sol gel coating on the solid-phase support.

24. A fluid storage and dispensing system according to claim 10, wherein the solid phase support comprises a particulate activated carbon material.

25. A fluid storage and dispensing system according to claim 10, wherein said solid-phase support comprises a material selected from the group consisting of activated carbon and crystalline aluminosilicate materials.

26. A fluid storage and dispensing system according to claim 10, wherein a dispensing assembly is coupled in fluid flow communication with the storage and dispensing vessel for selective on-demand dispensing from the vessel of fluid released from the affinity medium, wherein the dispensing assembly is constructed and arranged:

(I) to provide, exteriorly of the storage and dispensing vessel, a pressure below an interior pressure in the vessel, to effect release of fluid from the affinity medium, and flow of released fluid from the vessel through the dispensing assembly; and/or (II) to flow thermally released fluid therethrough, and comprising means for heating the affinity medium to effect release of the fluid therefrom, so that the released fluid flows from the vessel into the dispensing assembly.

27. A fluid storage and dispensing system according to claim 10, wherein the vessel is constructed and arranged for flow of a carrier gas stream therethrough, so that said fluid is released from the affinity medium and incorporated in the carrier gas stream flowed out of the vessel.

28. A fluid storage and dispensing system according to claim 10, further comprising a fluid retentively held by the affinity medium in said vessel.

29. A fluid storage and dispensing system, comprising:

a fluid storage and dispensing vessel constructed and arranged for selective dispensing of fluid therefrom;

a solid-phase support in the vessel; and an affinity medium on the solid-phase support, wherein the affinity medium reversibly takes up the fluid when contacted therewith, and from which the fluid is disengageable under dispensing conditions, wherein the affinity medium comprises a material selected from the group consisting of polyethylene glycols and methoxypolyethylene glycols.

30. A fluid storage and dispensing system, comprising:

a fluid storage and dispensing vessel constructed and arranged for selective dispensing of fluid therefrom;

a solid-phase support in the vessel; and an affinity medium on the solid-phase support, wherein the affinity medium reversibly takes up the fluid when contacted therewith, and from which the fluid is disengageable under dispensing conditions, wherein said fluid comprises a fluid species selected from the group consisting of ammonia, chlorine, HCl, $H_2S$, arsine, phosphine, ammonia, diborane, stibine, trichlorosilane, trimethylindium, dimethylaluminumhydroxide, tetrachlorotitanium, tetrakisdiethylamidotitanium, tetrakisdimethylamidotitanium, tetraethylorthosilicate, tungsten hexafluoride, copper hexafluoroacetylacetonate vinyl trimethylsilane, pentakisdiethylamidotantalum, dimethylamidotantalum, fluorinated derivatives of tetraethylorthosilicate, trimethylgallium, triethylindium, dichlorosilane, octamethylcyclotetrasiloxane, titaniumisopropoxide, iron pentacarbonyl, isopropanol and trimethylaluminum.

31. A fluid storage and dispensing system, comprising:

a fluid storage and dispensing vessel constructed and arranged for selective dispensing of fluid therefrom;

a solid-phase support in the vessel; and an affinity medium on the solid-phase support, wherein the affinity medium reversibly takes up the fluid when contacted therewith and from which the fluid is disengageable under dispensing conditions, wherein said affinity material comprises a silicone oil.

32. A fluid storage and dispensing system, comprising:

a fluid storage and dispensing vessel constructed and arranged for selective dispensing of boron trifluoride therefrom;

a solid-phase support in the vessel; and a polar and acid stable affinity medium on the solid-phase support, wherein the affinity medium reversibly takes up the boron trifluoride when contacted therewith, and from which the fluid is disengageable under dispensing conditions.

* * * * *

UNITED STATES PATENT AND TRADEMARK OFFICE
CERTIFICATE OF CORRECTION

PATENT NO.    : 6,027,547
DATED         : February 22, 2000
INVENTOR(S)   : Glenn M. Tom and Duncan W. Brown It is certified that error appears in the above-identified patent and that said Letters Patent is hereby corrected as shown below:

Column 1,
Line 31, change "30 C" to -- 30 C --.(that is minus 30 C)

Column 2,
Lines 49-50, change "diseng-agable" to -- disen-gagable --.

Column 3
Line 32, after "invention" insert -- , --.

Column 8,
Line 55, change "trimethylaluninum" to -- trimethylaluminum --.

Column 11,
Line 6, after "pentacarbonyl" insert -- , --.
Line 6, after "isopropanol" add -- and --.
Line 49, after "ammonia" insert -- , --

Signed and Sealed this

Twenty-first Day of January, 2003

JAMES E. ROGAN
*Director of the United States Patent and Trademark Office*